(12) United States Patent
Boothman et al.

(10) Patent No.: US 11,948,124 B2
(45) Date of Patent: Apr. 2, 2024

(54) SHIPMENT RECORD SYSTEMS AND METHODS

(71) Applicant: TRANSFORMATION PACKAGING LLC, Hebron, OH (US)

(72) Inventors: Jeff Boothman, Powell, OH (US); Miguel Baldwin, Lone Tree, CO (US)

(73) Assignee: Transformation Packaging LLC, Hebron, OH (US)

( * ) Notice: Subject to any disclaimer, the term of this patent is extended or adjusted under 35 U.S.C. 154(b) by 509 days.

(21) Appl. No.: 16/028,565

(22) Filed: Jul. 6, 2018

(65) Prior Publication Data

US 2019/0012639 A1    Jan. 10, 2019

Related U.S. Application Data

(60) Provisional application No. 62/529,519, filed on Jul. 7, 2017.

(51) Int. Cl.
*G06Q 10/083* (2023.01)

(52) U.S. Cl.
CPC .................. *G06Q 10/0838* (2013.01)

(58) Field of Classification Search
CPC ............ G06Q 10/0838; G06Q 10/08
USPC ................. 705/341, 337; 701/400
See application file for complete search history.

(56) References Cited

U.S. PATENT DOCUMENTS

| 9,142,035 | B1* | 9/2015 | Rotman | G07B 17/00661 |
| 9,230,233 | B1* | 1/2016 | Sundaresan | G06Q 50/30 |
| 9,686,481 | B1* | 6/2017 | Graybill | H04N 5/32 |
| 10,719,801 | B2* | 7/2020 | Quan | G06Q 10/087 |
| 10,853,757 | B1* | 12/2020 | Hill | G06Q 10/06398 |
| 2004/0184017 | A1* | 9/2004 | Litwin | G06Q 10/0833 355/40 |
| 2005/0218222 | A1* | 10/2005 | Nark | G06Q 10/06 705/1 |
| 2015/0088767 | A1* | 3/2015 | Varadarajan | G06Q 10/30 705/308 |
| 2017/0043953 | A1* | 2/2017 | Battles | B25J 9/16 |

(Continued)

OTHER PUBLICATIONS

Nitaigour Mahalik, Advances in Packaging Methods, Processes and Systems, Oct. 31, 2014 (Year: 2014).*

*Primary Examiner* — Emmett K. Walsh
*Assistant Examiner* — Ismail A Manejwala
(74) *Attorney, Agent, or Firm* — Wiggin and Dana LLP

(57) ABSTRACT

A variety of factors may affect a shipment as it travels from a sender to a recipient. However, reliably gathering and storing information relating to such factors may be difficult because of the wide variation in the means for generating and/or collecting such information. Accordingly, examples of the present disclosure describe shipment record systems and methods. In an example, an image capture device is used to generate image data relating to a shipment. The image data may be associated with the shipment to generate a shipment record, such that the shipment record may be later updated and/or retrieved. In examples, the shipment record comprises other shipment information relating to the shipment. As a result, it is possible to generate statistics, identify trends, and provide reports relating to one or more shipments, which increases accountability and enables shipping agents to dynamically adjust resource allocation, among other benefits.

24 Claims, 6 Drawing Sheets

(56) References Cited

U.S. PATENT DOCUMENTS

| | | | |
|---|---|---|---|
| 2017/0091706 A1* | 3/2017 | Lloyd | G06Q 10/0833 705/333 |
| 2017/0116571 A1* | 4/2017 | Tammattabattula | G06Q 10/0836 |
| 2017/0192413 A1* | 7/2017 | Langer | B65G 47/44 700/98 |
| 2018/0144285 A1* | 5/2018 | Hoffman | G06Q 10/083 700/230 |

* cited by examiner

SHIPMENT RECORD SYSTEMS AND METHODS

CROSS-REFERENCE TO RELATED APPLICATION

This application claims priority to U.S. Provisional Application No. 62/529,519, entitled "Shipment Record Systems and Methods," filed on Jul. 7, 2017, the entire disclosure of which is hereby incorporated by reference in its entirety.

INTRODUCTION

A variety of factors may affect a shipment as it travels from a sender to a recipient, including, but not limited to, the manner in which the shipment was packed, how many items or what type of items were packed in the shipment, whether it was tampered with, the amount of void space left in the shipping container, the type of packing material used, and/or the size of the shipment. However, reliably gathering and storing information relating to such factors may be difficult because of the wide variation in the means for generating and/or collecting such information.

SUMMARY

Examples of the present disclosure describe shipment record systems and methods. In an example, an image capture device may be used to generate image data relating to a shipment. The image data may be associated with the shipment to generate a shipment record, such that the shipment record may be later updated and/or retrieved. The shipment record may comprise other shipment information relating to the shipment, including, but not limited to, dimensions of the shipment, occupied/unoccupied volume of the shipping container, weight, item attributes, handling constraints, destination information, order information, user-generated data, identification information, information received from or associated with an onboard data collection device, and/or estimated delivery date. As a result of generating the shipment record, it may be possible to perform analysis relating to shipping agent reliability, provide increased packaging accountability, detect shipment or product tampering, develop improved packaging methods, and enable shipping agents to dynamically plan and adjust resource supply accordingly, among other benefits.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Figure 1:
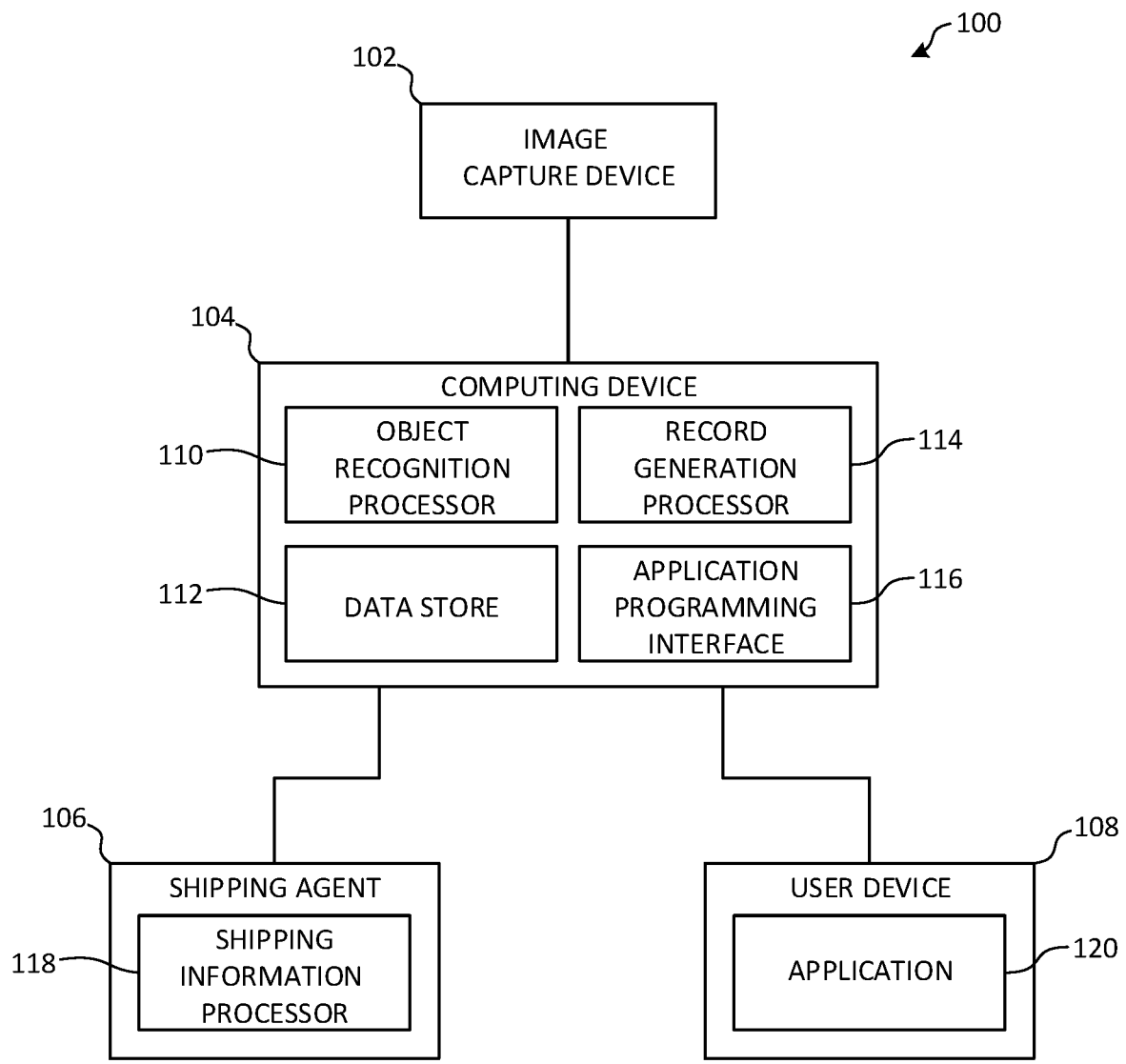
FIG. 1 depicts an example system for generating and processing a shipment record based at least in part on image data from an image capture device.

When preparing, processing, and delivering a shipment from a sender to a recipient, a variety of factors affect the condition in which the shipment arrives at its destination. Traditionally, tracking, identifying, and quantifying issues that affect shipments is difficult, due at least in part to the number of factors, the potential for variability, and the number of different agents that are involved throughout the process, as well as the general lack of accountability and recordkeeping. As such, there may be little to no record of the contents of a shipment and how the shipment was packed, which adds additional uncertainty when processing damage claims and complicates the identification of potential process improvements, among other issues.

Accordingly, the present disclosure provides shipment record systems and methods. In an example, a shipment record is generated and maintained for a shipment, wherein the shipment record comprises shipment information relating to the shipment. As a result of collecting, generating, and aggregating such information, the shipment record is useable to determine how the shipment was packed (e.g., shipment content, item arrangement, quantity and arrangement of void space, etc.), to determine what and/or how much packing material was used or was expected to be used, to resolve disputes about which items were included in a shipment, and to provide a record of item condition, which may be used to resolve damage claims.

In other examples, a shipment record is used to perform additional analysis, including, but not limited to, generating statistics, identifying trends, and/or providing reports. As an example, void space and content volume for several shipments are analyzed and compared to a box kit to generate a fit metric indicating how full the boxes are or to determine whether a different box kit may be used, thereby enabling more efficient use of packaging. In another example, a shipment record is analyzed to provide metrics relating to one or more shipment packers. For instance, it may be determined which shipment packers are packaging shipments correctly and/or efficiently, and which shipment packers are causing items to be damaged and/or using space inefficiently. Cycle time (e.g., number of shipments packed per hour, average time spent preparing shipment, etc.) may also be determined for a shipment packer. Shipment records may also be provided to and/or accessed by a shipping agent, which may use such information to allocate shipping resources accordingly. Accordingly, image data may comprise one or more timestamps associated with when the data was captured (e.g., a start timestamp for the packing process, an end timestamp for the packing process, etc.). In other examples, machine learning techniques are used to evaluate packaging type, packing techniques, and/or box kit attributes in combination with shipping damage data to generate packaging effectiveness metrics. While example shipment record uses and analyses are described herein, it will be appreciated that a shipment record may be used for any of a variety of purposes and analyses.

FIG. 1 depicts an example system 100 for generating and processing a shipment record based at least in part on image data from an image capture device. As illustrated, system 100 comprises image capture device 102, computing device 104, shipping agent 106, and user device 108. Image capture device 102 may be a still camera (e.g., a digital camera, a mobile device camera, etc.), a video camera (e.g., a digital video camera, a web camera, etc.), a stereoscopic image capture device, a structured light camera, or any other image capture device. In some examples, image capture device 102 may capture depth information associated with image data, such that the depth information may be used to generate a three-dimensional representation of at least a part of the captured image data or perform object recognition, among other uses. It will be appreciated that while system 100 is illustrated as having one image capture device 102, additional image capture devices may be used.

Computing device 104 comprises object recognition processor 110, data store 112, record generation processor 114, and application programming interface 116. Computing device 104 may be any of a variety of computing devices, including, but not limited to, a personal computing device, a mobile computing device, a tablet computing device, a server computing device, or a distributed computing device. In some examples, computing device 104 may operate or be part of a warehouse management system (WMS). As an example, a WMS may track information about items or shipments as they travel through a distribution center or may maintain inventory information, among other functionality.

Computing device 104 may receive or access image data from image capture device 102. As described herein, image capture device 102 may be used to capture image data from one or more locations of a packing system. In some examples, multiple image capture devices may be used in addition to or as an alternative to repositioning image capture device 102. In an example, image capture device 102 may provide image data as one or more files, as a data stream, or any combination thereof. Object recognition processor 110 may access image data from image capture device 102 and identify one or more objects or items using object recognition.

In some examples, object recognition may comprise evaluating depth information received from image capture device 102, comparing stereoscopic images, and/or using edge detection, among other object recognition techniques. In other examples, object recognition processor 110 may identify machine-readable information within the image data, including, but not limited to, one or more barcodes, Quick Response (QR) codes, or text using optical character recognition (OCR). In an example, computing device 104 may determine void space for a shipment, wherein the voice space may comprise one or more regions of space not occupied by the one or more objects or items. In examples, computing device 104 may evaluate any of a variety of information to determine the void space, including, but not limited to, image data, depth information, and/or object information (e.g., as may be determined based on machine-readable information).

Data store 112 may store one or more shipment records. In an example, a shipment record may be associated with a unique identifier (e.g., a globally unique identifier (GUID), a universally unique identifier (UUID), a shipping agent tracking number, etc.). In some examples, the shipment record may contain shipment information, such as what items are contained within a shipment, item attributes (e.g., relating to fragility, weight, dimensions, cost, etc.), an estimated or promised delivery date, recipient address information, and/or an identity associated with a person who prepared the shipment, among other information. In other examples, a shipment record stored by data store 112 may be accessed using a unique identifier to retrieve an associated shipment record. It will be appreciated that other retrieval techniques may be used and that a shipment record may comprise any of a variety of other information types.

Record generation processor 114 may generate and update a shipment record. In some examples, record generation processor 114 may receive information from object recognition processor 110, from a WMS, from shipping information processor 118, or from client application 120, among other data sources. Accordingly, record generation processor 114 may generate a shipment record based on the received information and store the generated record in data store 112. As an example, record generation processor may receive a unique identifier (e.g., as may be recognized by object recognition processor 110, as may be determined for a shipment using a Radio Frequency Identification (RFID) reader (for example, present on a label disposed on an exterior of the shipment), etc.). Record generation processor 114 may also receive image data (e.g., from image capture device 102), one or more recognized objects or items (e.g., as may be recognized by object recognition processor 110), and/or at least some shipment information as described above, which record generation processor 114 may use to generate a shipment record.

In other examples, record generation processor 114 may make updates to a shipment record, wherein record generation processor 114 may access a shipment record from data store 112 and add, remove, or update information from the accessed shipment record. For example, record generation processor 114 may receive updated tracking information for a shipment from shipping agent 106 and may update a shipment record stored in data store 112 accordingly. In another example, a shipment record may be updated to indicate that the shipment has been fulfilled, delayed, or backordered.

In examples, record generation processor 114 may automatically process one or more shipment records to generate statistics, identify trends, and/or provide reports. Record generation processor 114 may perform such processing periodically and/or in response to the occurrence of an event. In examples, record generation processor 114 may evaluate the generated data in relation to one or more thresholds, such that an indication may be provided if the generated data exceeds a threshold. For example, record generation processor 114 may evaluate a set of shipment records (e.g., based on a date range, a shipping agent, a sender, a recipient, a packer, etc.) to determine a percentage of shipments that arrived damaged, were returned, were lost, etc. If the determined percentage is below an acceptable threshold, an indication may be provided to a shipper, a manager, or other entity such that corrective action can be taken. Another example entails generating statistics for various packers at a warehouse, wherein packers may be evaluated based on expediency, space efficiency, and/or packing correctness, among other factors.

In some instances, a suggestion may be generated when a threshold is exceeded, wherein the suggestion may provide an indication of one or more corrective actions that could be taken. For example, a pre-generated database of suggestions may be accessed, or the suggestion may be generated based on a machine learning model trained at least in part using historical actions, among other examples. While example processing is described herein, it will be appreciated that shipment records may be processed and evaluated based on any of a variety of thresholds.

In an example, record generation processor 114 may provide at least a part of a shipment record to shipping agent 106. For example, record generation 114 may provide an indication to shipping agent 106 that a shipment associated with a shipment record will be provided to shipping agent 106 for transportation or delivery. The indication may comprise dimensions and/or a weight for the shipment, as well as other shipment information as described above. As a result, shipping agent 106 may be able to dynamically update projected shipping demand and resource requirements in response to the received indication, thereby enabling shipping agent 106 to dynamically manage available resources.

Application programming interface 116 may be used by applications and/or computing devices or components (e.g., client application 120 and/or shipping information processor 118) to access or manipulate a shipment record stored by data store 112. For example, application programming interface 116 may be used to update information of a shipment record (e.g., with updated tracking information, whether a return shipment has been provided to a shipping agent, etc.) or access information from a shipment record (e.g., when the shipment was shipped, image data associated with the shipment, what items are contained within the shipment, packing materials or techniques used with the shipment, etc.).

System 100 also comprises shipping agent 106, which may transport one or more shipments from a sender to a recipient. As an example, shipping agent 106 may transport shipments between on-line retailers or manufacturers to consumers or third-party retailers or individuals shipping packages via a parcel system. Shipping agent 106 comprises shipping information processor 118, which may track a shipment throughout the shipping network of shipping agent 106. In an example, shipping information processor 118 may generate a shipping label for a shipment, acknowledge receipt of a shipment by the shipping agent, update tracking information, and/or provide a delivery indication when a shipment is delivered by shipping agent 106.

In some examples, shipping information processor 118 may provide information to computing device 104 (e.g., via application programming interface 116, in response to a received request, etc.). For example, shipping information processor 118 may provide updated shipment tracking information to computing device 104, such that a shipment record associated with the shipment may be updated to comprise the updated shipment tracking information. In another example, computing device 104 may receive historical information (e.g., delivery/delay statistics, damage information, etc.) or information relating to the shipment, which may be analyzed to determine one or more patterns. In an example, the information may be analyzed using machine learning techniques, statistical analysis, and/or threshold analysis, among other techniques. The identified patterns may be used to generate one or more suggestions (e.g., for improving packing techniques or transportation modes, etc.) in order to reduce the likelihood of damage to the shipment.

In other examples, shipping information processor 118 may receive information from computing device 104. As an example, shipping information processor 118 may receive dimensions and/or a weight for a shipment that will be provided to shipping agent 106, as was discussed above. In another example, shipping information processor 118 may receive image data relating to a shipment, thereby enabling shipping agent 106 to determine the content and condition of the shipment (e.g., what items were in the shipment, whether the shipment was packed properly, whether an item was damaged in transit, etc.).

User device 108 may be any of a variety of electronic devices, including, but not limited to, a mobile computing device, a tablet computing device, a desktop computing device, or a laptop computing device. As illustrated, user device 108 comprises application 120. In an example, application 120 may be an application executing on user device 108, or may be a web application executing in a browser of user device 108, among other applications.

Application 120 may access information relating to a shipment record from computing device 104. As an example, a user of user device 108 may use application 120 to access a shipment record relating to an order placed by the user. As a result, application 120 may receive information relating to the order and the related shipment, such as a projected or past shipping date, content of the shipment, and image data associated with the shipment (e.g., comprising one or more items in the shipment, a view of the manner in which the shipment was packed, etc.). The user may provide an order number, a shipping agent tracking number, or other unique identifier to retrieve information relating to the shipment record from computing device 104. In some examples, application 120 may use application programming interface 116 to interact with shipment records stored by data store 112. In one example, application 120 may be used to update information in a shipment record, such as indicating receipt of the shipment, requesting a return or a replacement shipment, updating the received quality of an item of the shipment, etc.

In another example, application 120 is used to perform and/or access any of a variety of analytics based on one or more shipment records according to aspects described herein. For instance, a user of application 120 on user device 108 may request one or more shipment records be processed to generate statistics, identify trends, and/or provide reports. As another example, application 120 is used to access previously generated statistics, trends, and/or reports (e.g., as may be generated periodically, in response to the occurrence of an event, etc.), such that the user may manipulate such analytics, evaluate one or more shipment records used to generate the analytics, and/or take corrective action to remedy potential or identified issues. In some instances, the user may specify a schedule with which such analytics should be generated.

It will be appreciated that the operations and functionality described above need not be provided using the example configuration described above with respect to system 100, and may instead be provided using any number or type of computing devices, processors, and components. For example, any number of image capture devices may be used and multiple shipping agents may interact with computing device 104. In another example, data store 112 may comprise a local and/or remote data store, such as a network-attached storage device or cloud storage.

As a result of generating and maintaining a shipment record for a shipment, improved accountability and availability of data analytics is achieved (e.g., for shipping agents, for shipment packers, for various shipping materials, etc.). For example, image data associated with a shipment record may be used to verify the condition of an item prior to shipping in order to determine the cause of damage that may have occurred in transit (e.g., the item was damaged prior to shipping, the item was incorrectly packaged, etc.). In an example, a retailer may be able to analyze collected data to determine whether a shipping agent is unreliable as compared to other shipping agents. In another example, it may be possible to identify whether a shipment packer tends to package items poorly, thereby providing accountability when preparing items for shipment. In some examples, a shipment record may be used to verify a claim that an item was omitted from a shipment (e.g., based on image data, based on shipment manifest or list of items, etc.). It will be appreciated that other benefits may be provided as a result of aspects disclosed herein.

Figure 2:
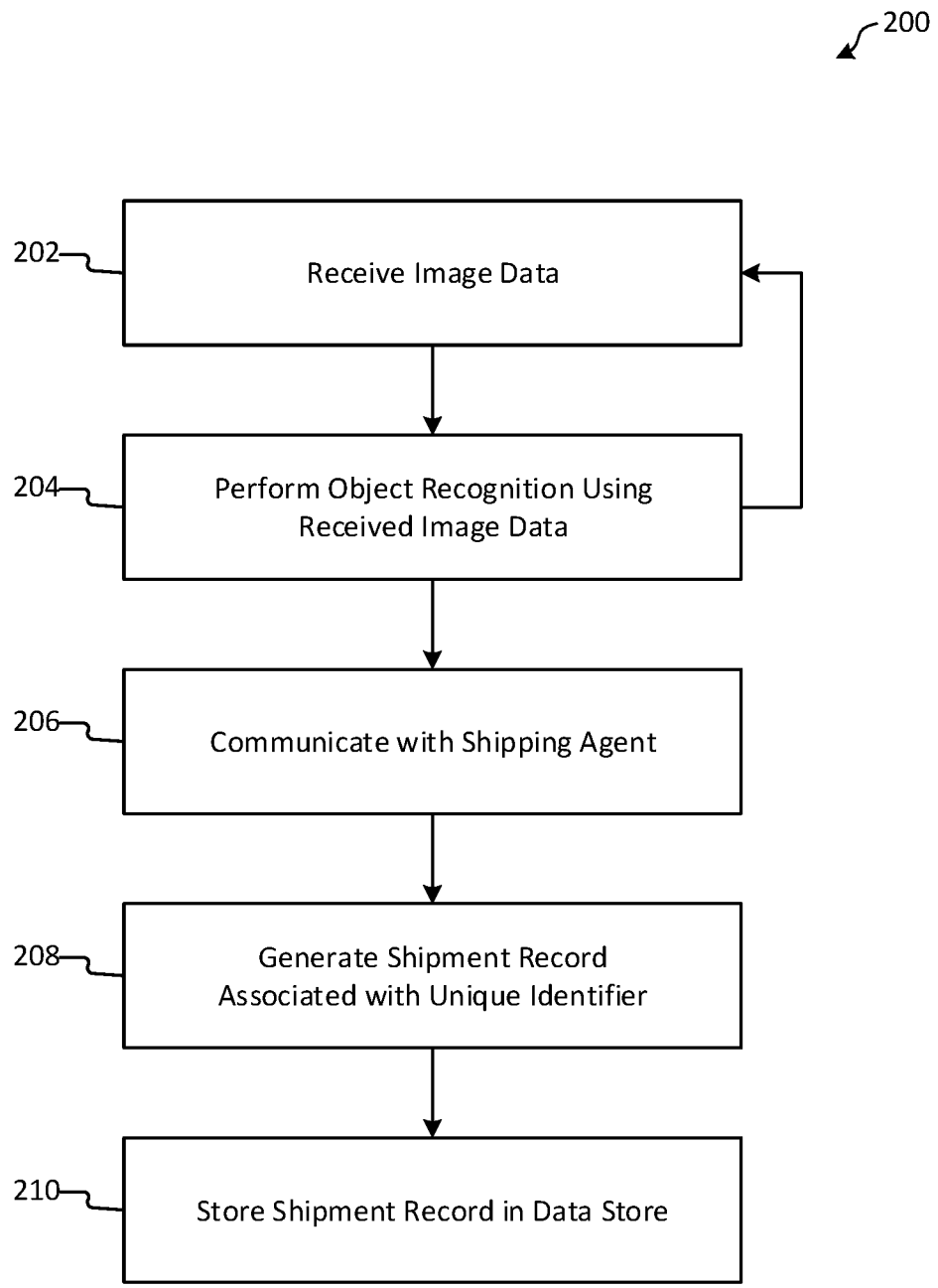
FIG. 2 depicts an example method for generating a shipment record based at least in part on image data from an image capture device.

FIG. 2 depicts an example method 200 for generating a shipment record based at least in part on image data from an image capture device. In an example, method 200 may be performed by a computing device, such as computing device 104 in FIG. 1. Method 200 begins at operation 202, where image data may be received. As an example, image data may be received from an image capture device (e.g., image capture device 102 in FIG. 1), accessed from a data store, or any combination thereof. In an example, the image data may be received as a file, as a data stream, or any combination thereof. The image data may comprise an image, one or more frames of a video, a stereoscopic image, or any other type of image data. The image data may comprise one or more shipments, such as boxes or containers, among other types of shipments.

Moving to operation 204, object recognition may be performed using the received image data. In an example, object recognition may be performed using an object recognition processor, such as object recognition processor 110 in FIG. 1. One or more items may be recognized within the image data. In some examples, machine-readable information may be recognized, such as a barcode or QR code. In some examples, flow may loop between operations 202 and 204, wherein an image capture device may generate multiple captures at the same location or may be moved to different locations (e.g., as additional items are added to a shipment, before and after packing material is added to a shipment, etc.). In an example, multiple image capture devices may be used to generate image data that may be received at operation 202. Accordingly, flow loops between operations 202 and 204, such that multiple captures may be received from one or more image capture devices.

Eventually, flow progresses to operation 206, wherein a communication may occur with a shipping agent (e.g., shipping agent 106 in FIG. 1). In an example, the communication may comprise dimension and/or weight information relating to the shipment, as may be determined from the image data (e.g., based on measurements, based on looking up information associated with identified machine-readable information, etc.). In another example, the information may be retrieved or received from another information source, such as an RFID reader or a WMS. As an example, the WMS provides information associated with the items of the shipment, which is used to determine the shipment weight. In another example, a scale is used. In another example, a quantity of packing material may also be used when calculating the shipment weight. In some examples, communicating with the shipping agent may comprise receiving information, such as a shipment tracking number, an estimated shipping cost, or an estimated delivery date, among other information.

At operation 208, a shipment record may be generated, wherein the shipment record may be associated with a unique identifier. In some examples, the unique identifier may be generated randomly, may be based on an order number or a shipping agent tracking number, or may be programmatically generated based on information relating to the shipment. The shipment record may comprise image data (e.g., as may have been received at operation 202), generated data associated with the image data (e.g., a point cloud, one or more 3D models, measurement information, etc.), a list of one or more items of the shipment (e.g., as may have been recognized at operation 204), information received or accessed from a WMS, and/or information received from a shipping agent, among information from other information sources.

The generated shipment record may comprise other shipment information, such as user-generated data (e.g., as may be input by a packer while packing the shipment, when inspecting the shipment, etc.), which may comprise a location, a packout line, a packer identification information (e.g., name, badge number, etc.). In another example, the shipment record comprises information relating to the box itself (e.g., as may be recognized through object recognition, from an RFID tag, etc.), such as a box identifier, carrier manifest number, or order number. The shipment information may comprise manifest information, and may, in some examples, be accessed or received from a shipping agent. In an example, the manifest information comprises one or more box sizes, a shipment destination, weights and/or dimensions, etc. In examples, the shipment information comprises order information (e.g., which may be accessed from a sales management or point of sale platform, provided by a shipper, etc.), including, but not limited to, an order date, customer information (e.g., email address, phone number, name, address, etc.), and/or information relating to the items ordered (e.g., item descriptions, weights, SKUs, costs, prices, etc.). It will be appreciated that any of a variety of other information associated with the shipment may be used to generate the shipment record.

Moving to operation 210, the generated shipment record may be stored in a data store. As an example, the shipment record may be stored in data store 112 in FIG. 1. In some examples, the data store may be indexed using the unique identifier with which the shipment record is associated. In examples, the data store can be searched to identify one or more shipment records based on partial, inexact, or exact matching techniques. The data store may comprise a local data store and/or a remote data store. Flow terminates at operation 210.

Figure 3:
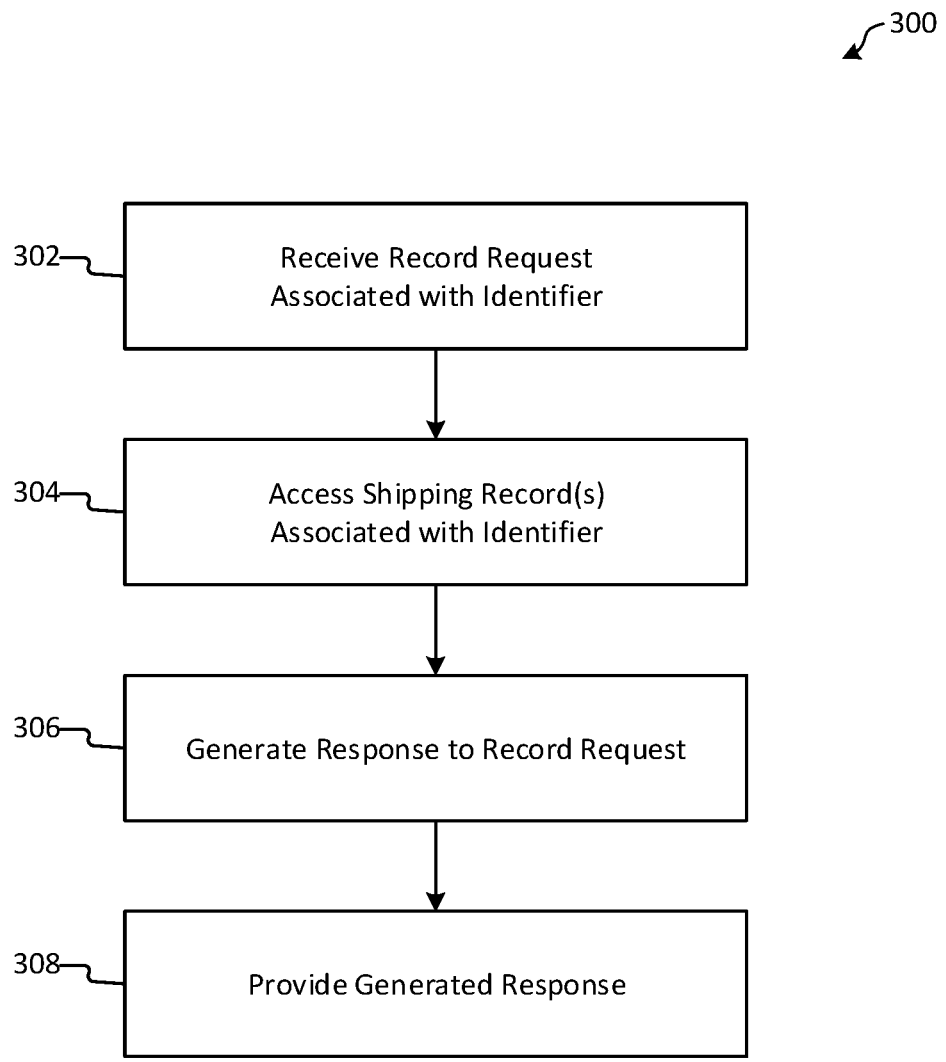
FIG. 3 depicts an example method for requesting one or more shipment records.

FIG. 3 depicts an example method 300 for requesting one or more shipment records. In an example, method 300 may be performed by a user device (e.g., user device 108) or a shipping agent (e.g., by shipping information processor 118 of shipping agent 106 in FIG. 1). For example, a user of a user device may request shipment information to determine the current status of the shipment, to verify the contents of the shipment, or to generate packer statistics, among other examples. In another example, a shipping agent may request shipment information for logistical purposes (e.g., determining an allocation of shipping resources, to determine whether to pick up shipments from a warehouse, etc.) or to generate statistics (e.g., on-time statistics, damaged shipments, etc.), among other examples.

Method 300 begins at operation 302, where a record request is received. In an example, the record request may be associated with an identifier (e.g., tracking number, manifest number, etc.) useable to identify one or more shipment records associated with the identifier. For example, the record request may comprise information useable to identify a shipment record using inexact matching techniques (e.g., a partial name, shipping address, order number, a date range, etc.). It will be appreciated that other examples may use different retrieval techniques without departing from aspects disclosed herein. In some examples, the request may be received via an application programming interface (e.g., application programming interface 116 in FIG. 1). In examples, the record request may specify a subset of shipping information (e.g., image data, manifest information, etc.).

At operation 304, one or more shipment records are accessed, which may be associated with the received identifier. As an example, a shipment record may be accessed from a data store, such as data store 112 in FIG. 1. In some examples, the shipment record may be accessed from a local or remote data store. In other examples, accessing the shipment records may comprise determining different unique identifiers with which the shipment record is associated. As an example, the shipment records may be associated with unique identifiers comprising GUIDs for each shipment record, whereas the received identifier of the record request may comprise a shipping agent tracking number, an order number, a customer name, etc.

Moving to operation 306, a response is generated to the record request. Generating the response may comprise selecting one or more parts of the accessed shipment records to provide in response, such as image data of each shipment record, estimated arrival dates, content of the shipments, etc. In some examples, the image data may be processed to indicate one or more identified items. As an example, an overlay may be provided to emphasize an item within the image data. In another example, image data from multiple captures may be combined into a single, combined image, thereby generating a collage of images from various stages in a packaging process (as will be discussed in further detail below with respect to FIG. 4).

In some examples, generating the response comprises performing additional analysis according to aspects described herein. For example, the one or more shipment records are analyzed to compare void space and content volume to one or more box size kits to determine whether different box sizes should be used in order to use packaging more efficiently, thereby reducing the associated cost when shipping similar items in the future. In some instances, machine learning techniques are used to identify a specific type of packing material (e.g., air pillows, foam, EXPANDOS, etc.) when performing such a determination. In another example, the shipment records are analyzed to provide metrics relating to one or more shipment packers. For instance, it may be determined which shipment packers are packaging shipments correctly and/or efficiently, and which shipment packers are causing items to be damaged and/or using space inefficiently. Cycle time (e.g., number of shipments packed per hour, average time spent preparing shipment, etc.) may also be determined for a shipment packer. While example shipment record uses and analyses are described herein, it will be appreciated that a shipment record may be used for any of a variety of purposes and analyses.

At operation 308, the generated response may be provided. The generated response may be provided as a webpage or as a response to an application programming interface call (e.g., via application programming interface 116 in FIG. 1). In some examples, the generated response may be communicated using an electronic communication, such as an email, text message, or instant message. Flow terminates at operation 308.

Figure 4:
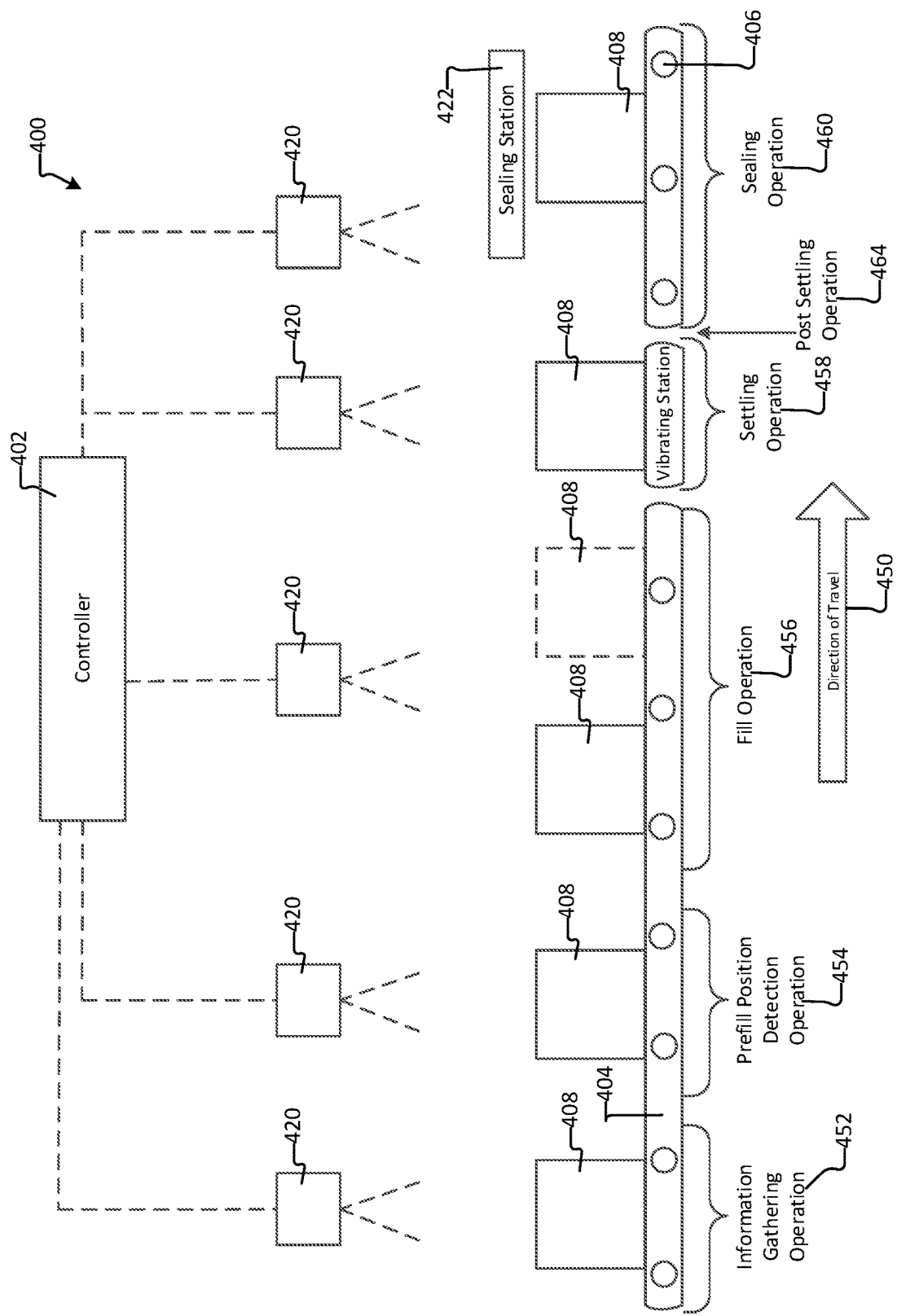
FIG. 4 depicts a schematic diagram of an example of an automated packing system in which aspects of the present disclosure may be applied.

FIG. 4 depicts a schematic diagram of an example of an automated packing system. In general, the system 400 includes elements, structures, and components that enable certain operations. System 400 comprises a conveyance system that includes multiple conveyor belts 404, 406. As such, along a direction of travel 450 of the conveyance system, the system 400 includes an information gathering operation 452 where information is obtained regarding the box dimensions, e.g., interior volume, contents thereof, contents volume, etc. A position of the box 408 is detected at a prefill position detection operation 454, prior to reaching the fill operation 456. In examples, image data from one or more image capture devices 420 is used to determine whether packing elements should be added at fill operation 456. In such examples, if it is determined no packing material is needed, the box 408 skips operations 456 and, in some instances, operation 458, an instead arrives at sealing operation 460. In other examples, a settling or agitation operation 458 settles the packing elements into the box 408, prior to entering a sealing operation 460, after which the box 408 exits the system 400. A post-settling operation 464 is disposed after the vibration station, so as to complete fill of the box with packing elements (since the packing elements may have settled during the agitation operation). Last, the box 408 passes through a sealing station 422 that may utilize tapes, liquid adhesives, and/or mechanical fasteners, as required, to seal the box 408. In an example, box 408 may be a shipment as described herein.

A controller 402, which may be a programmable logic controller (PLC), warehouse management system (WMS), or other device (e.g., computing device 104 in FIG. 1), is utilized to collect and process information relating to box 408. For example, one or more image capture devices 420 may be used to capture image data of box 408 at one or more points of the conveyance system, as illustrated. According to aspects disclosed herein, the image data may be processed to perform object recognition. In another example, controller 402 may receive information from other data sources, such as an RFID reader. Controller 402 may generate a shipment record based on image data captured by one or more of image capture devices 420, wherein the shipment record may be associated with a unique identifier for box 408. As a result of capturing image data using one or more of image capture devices 420 or from one or more such positions, the shipment record may comprise information relating to the state of box 408 and its contents that may be used to verify the condition, quantity, and/or arrangement of items in box 408, among other uses. According to aspects described herein, the generated shipment record may comprise any of a variety of other shipment information, including, but not limited to, information gathered at information gathering operation 452 or information received from controller 402 and/or other devices.

System 400 is provided as an example system with which aspects of the present disclosure may be practiced. It will be appreciated that other examples may comprise fewer, additional, or alternative components. In some examples, aspects disclosed herein may be practiced by a computing device of an individual preparing a shipment, wherein an image capture device may be a camera or mobile phone of the individual, or the computing device itself. In other examples, aspects may be practiced by a large-scale company, such as an online retailer or manufacturer. An additional example environment in which aspects of the present disclosure may be practiced is discussed in greater detail by U.S. Patent Publication No. 2017/0008654, the disclosure of which is hereby incorporated by reference herein in its entirety.

Figure 5:
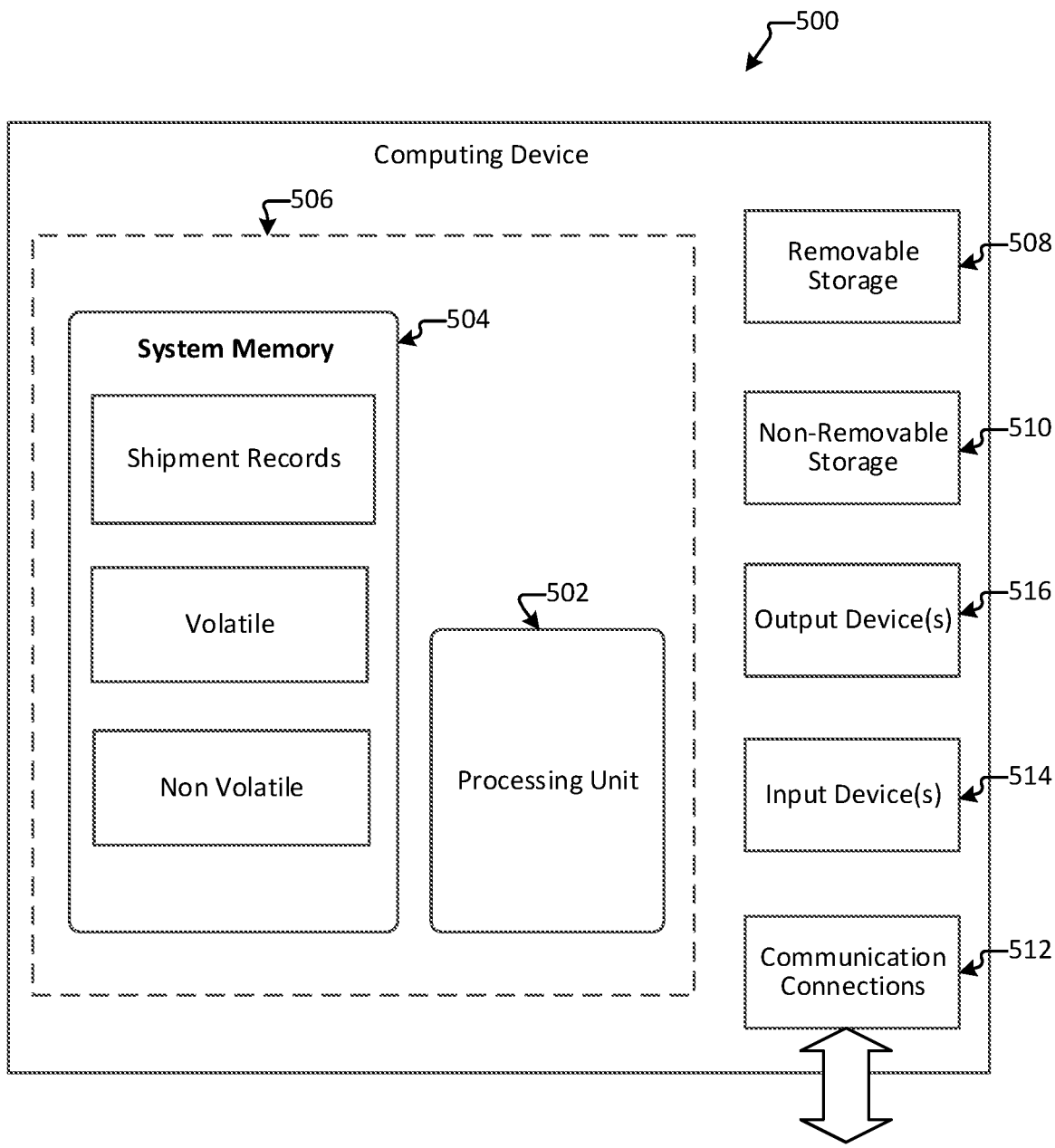
FIG. 5 illustrates one example of a suitable operating environment in which one or more of the present examples may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, smartphones, tablets, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, instructions to process image data and generate and maintain shipment records as described herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as touch screens, keyboard, mouse, pen, voice input, etc. and/or output device(s) 516 such as a display, speakers, printer, etc. Also included in the environment may be one or more communication connections, 512, such as LAN, WAN, point to point, Bluetooth, RF, etc.

Operating environment 500 typically includes at least some form of computer readable media. Computer readable media can be any available media that can be accessed by processing unit 502 or other devices utilizing the operating environment. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

In some embodiments, the components described herein include such modules or instructions executable by computer system 500 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 500 is part of a network that stores data in remote storage media for use by the computer system 500.

Figure 6:
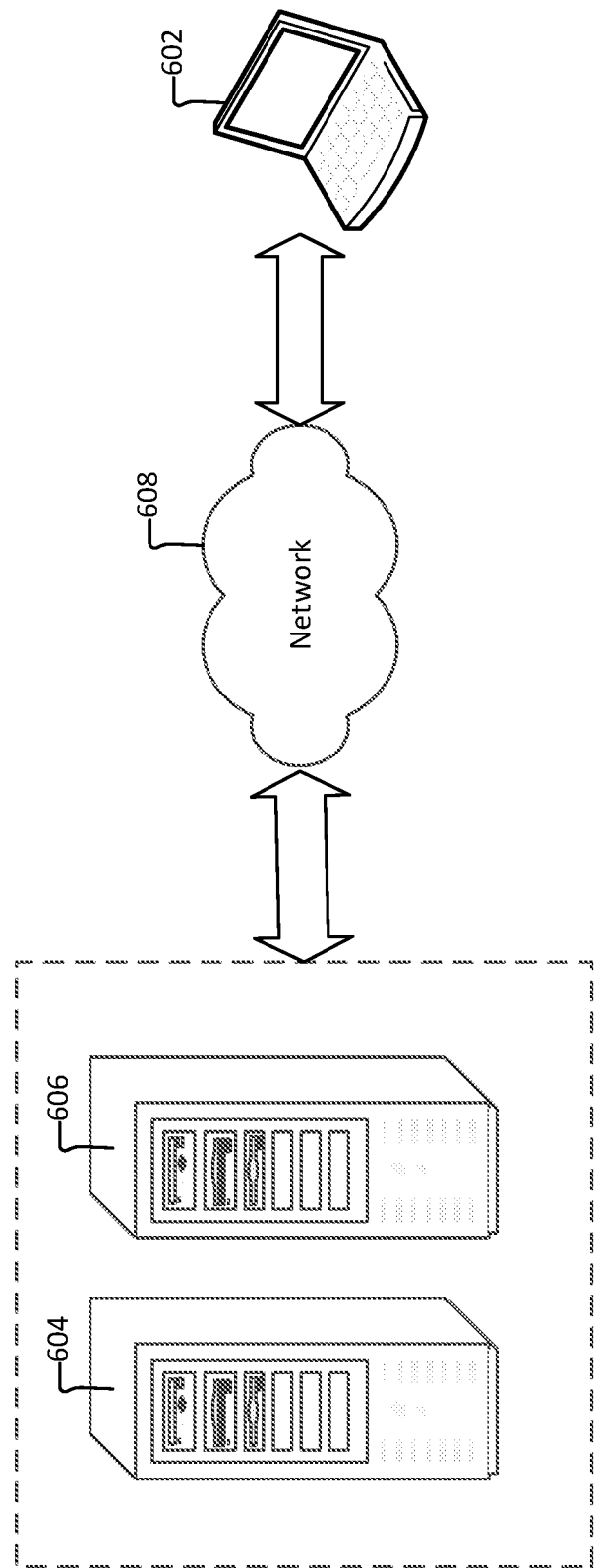
FIG. 6 is an embodiment of a network in which the various systems and methods disclosed herein may operate.

FIG. 6 is an embodiment of a network 600 in which the various systems and methods disclosed herein may operate. In embodiments, portable device, such as client device 602, may communicate with one or more servers, such as servers 604 and 606, via a network 608. In embodiments, a client device may be a laptop, a tablet, a personal computer, a smart phone, a PDA, a netbook, or any other type of computing device, including individual controllers for various components of the packing system, and the computing device in FIG. 5. In embodiments, servers 604 and 606 may be any type of computing device, such as the computing device illustrated in FIG. 5. Network 608 may be any type of network capable of facilitating communications between the client device and one or more servers 604 and 606. Examples of such networks include, but are not limited to, LANs, WANs, cellular networks, and/or the Internet.

In embodiments, the various systems and methods disclosed herein may be performed by one or more server devices. For example, in one embodiment, a single server, such as server 604 may be employed to perform the systems and methods disclosed herein. Portable device 602 may interact with server 604 via network 608 in send testing results from the device being tested for analysis or storage. In further embodiments, the portable device 602 may also perform functionality disclosed herein, such as by collecting and analyzing testing data.

In alternate embodiments, the methods and systems disclosed herein may be performed using a distributed computing network, or a cloud network. In such embodiments, the methods and systems disclosed herein may be performed by two or more servers, such as servers 604 and 606. Although a particular network embodiment is disclosed herein, one of skill in the art will appreciate that the systems and methods disclosed herein may be performed using other types of networks and/or network configurations.

As will be understood from the foregoing disclosure, one aspect of the technology relates to a system comprising: an image capture device; a processor; and a memory storing instructions that, when executed by the at least one processor, performs a method for generating a shipment record. The method comprises: receiving image data from the image capture device, wherein the image data relates to a shipment; generating, using object recognition, one or more recognized objects from the received image data, wherein the one or more recognized objects are associated with items of the shipment; generating a shipment record comprising at least a part of the image data and information relating to the one or more recognized objects; associating the shipment record with a unique identifier; and storing the shipment record associated with the unique identifier in a data store. In an example, at least a part of the image data is received prior to adding packing material to the shipment. In another example, the method further comprises: determining dimension information relating to the shipment, wherein the dimension information is based at least in part on the object recognition; and performing at least one of: providing the determined dimension information to a shipping agent; and storing the dimension information as at least a part of the information relating to the one or more recognized objects of the generated shipping record. In a further example, the dimension information relating to the shipment are determined prior to adding packing material to the shipment, and wherein at least a part of the image data is received after adding the packing material to the shipment. In yet another example, the method further comprises: accessing information relating to the shipment from a shipping agent; and updating the stored shipment record based on the accessed information. In a further still example, the image capture device comprises a stereoscopic camera that captures depth information, and wherein generating the one or more recognized objects comprises using the depth information to identify the one or more recognized objects from the image data. In another example, the method further comprises: performing an evaluation of the determined dimension information relating to the shipment, additional dimension information relating to the one or more recognized objects, and remaining void space before and after adding the packing material to the shipment; and generating, based on the evaluation, a fit metric associated with a box kit used for several shipments. In a further example, the system further comprises a radio-frequency identification (RFID) reader, wherein the unique identifier is determined based on RFID tag information received from the RFID reader, and wherein the RFID tag information is associated with the shipment record. In yet another example, the method further comprises: determining a remaining void space for the shipment after adding packing material to the shipment. In a further still example, the method further comprises: accessing one or more other shipment records from the data store; evaluating the accessed one or more other shipment records and the generate shipment record using machine learning techniques to determine one or more patterns; and generating one or more suggestions based on the determined one or more patterns. In another example, the method further comprises: generating a combined image based on the image data, wherein the combined image comprises a plurality of images, and wherein the combined image comprises a timestamp for each of the plurality of images; and associating the combined image with the shipment record in the data store.

In another aspect, the technology relates to a method for processing a shipment record associated with a shipment. The method comprises: receiving image data from an image capture device, wherein the image data relates to the shipment; generating, using object recognition, one or more recognized objects based on the received image data, wherein the one or more recognized objects are associated with items of the shipment; generating a shipment record comprising at least a part of the image data and information relating to the one or more recognized objects; storing the shipment record in a data store, wherein the shipment record is associated with a unique identifier; accessing one or more other shipment records from the data store; evaluating the accessed one or more shipment records using machine learning techniques to determine one or more patterns; determining whether at least one of the one or more patterns exceeds a threshold; when at least one of the one or more patterns exceeds the threshold, generating at least one suggestion based on the one or more patterns; and providing the at least one suggestion to a user device as an electronic communication. In an example, the method further comprises: determining dimension information relating to the shipment, wherein the dimension information is based at least in part on the object recognition; and storing the dimension information as at least a part of the information relating to the one or more recognized objects of the generated shipping record. In another example, the dimension information relating to the shipment is determined prior to adding packing material to the shipment, and at least a part of the image data is received after adding the packing material to the shipment. In a further example, the method further comprises: generating a combined image based on the image data, wherein the combined image comprises a plurality of images, and wherein the combined image comprises timestamps for each of the plurality of images, wherein the timestamps comprise a start timestamp and an end timestamp for packing the shipment; and associating the combined image with the shipment record in the data store. In yet another example, the method further comprises: receiving user-generated data associated with the shipment; and storing at least a part of the received user-generated data as part of the shipment record in the data store.

In a further aspect, the technology relates to a method for generating a shipment record. The method comprises: receiving image data from an image capture device, wherein the image data relates to a shipment; generating, using object recognition, one or more recognized objects from the received image data, wherein the one or more recognized objects are associated with items of the shipment; generating a shipment record comprising at least a part of the image data and information relating to the one or more recognized objects; associating the shipment record with a unique identifier; and storing the shipment record associated with the unique identifier in a data store. In an example, the method further comprises: accessing one or more other shipment records from the data store; evaluating the accessed one or more other shipment records and the generated shipment record using machine learning techniques to determine one or more patterns; and generating one or more suggestions based on the determined one or more patterns. In another example, the method further comprises: communicating at least a part of the generated shipment record to a shipping agent. In a further example, the method further comprises: receiving a record request from a user device, wherein the record request comprises an identifier; identifying at least one relevant shipment record based on the identifier; and providing at least a part of the identified at least one relevant shipment record to the user device in response to the received request.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured all such modifications as fall within the spirit and scope of the technology. Accordingly, what is desired to be secured by Letters Patent is the technology as defined and differentiated herein, and all equivalents.

What is claimed is:

1. A system comprising:
   a controller;
   a record generation processor;
   an image recognition processor;
   a shipping information processor; and
   a memory storing instructions that, when executed by the processor, perform operations, comprising:
      receiving, via the image recognition processor, a first image data from a first image capture device, wherein the first image data relates to an interior of the shipment located at an information gathering station before a packing material is added;
      recognizing, via the image recognition processor, a first object from the first image data, the first object being recognized as an item to be shipped with the shipment;
      actuating, via the controller, transport of the shipment from the information gathering station to a filling station distinct from the information gathering station via a conveyance system;
      receiving, via the record generation processor, a second image data from a second image capture device different from the first image capture device, wherein the second image data relates to the interior of the shipment located at the filling station after the packing material is added;
      recognizing, via the image recognition processor, a second object from the second image data, the second object being recognized as the packing material for the shipment;
      identifying, via the image recognition processor, information associated with packing the item for the shipment;
      generating, via the record generation processor, a shipment record comprising:
         at least a part of the first image data;
         at least a part of the second image data; and
         at least a part of the information associated with packing the item for the shipment;
      determining, via the image recognition processor, an inside configuration of the shipment, the inside configuration of the shipment comprising at least one of shipment content, item arrangement in the shipment, quantity of void space, and arrangement of void space based on the shipment record;
      associating, via the shipping information processor, the shipment record with a unique identifier;
      storing, at the memory, the shipment record associated with the unique identifier in a data store; and
      based on the determined inside configuration of the shipment, training a machine learning model for at least a correlation between the item to be shipped with the shipment and the packing material for the shipment.

2. The system of claim 1, wherein at least a part of the image data is received prior to adding the packing material to the shipment.

3. The system of claim 1, further comprising instructions for:
   determining dimension information relating to the shipment.

4. The system of claim 3, wherein the dimension information is determined prior to adding the packing material to the shipment, and wherein at least a part of the image data is received after adding the packing material to the shipment.

5. The system of claim 1, further comprising instructions for:
   accessing information relating to the shipment from a shipping agent; and
   updating the stored shipment record based on the accessed information.

6. The system of claim 1, wherein the image capture device comprises an image sensor that captures depth information, and wherein recognizing the object as the item to be shipped with the shipment comprises using the depth information to recognize the object from the image data.

7. The system of claim 4, further comprising instructions for:
   performing an evaluation of the determined dimension information relating to the shipment, additional dimension information relating to the one or more recognized objects, and remaining void space before and after adding the packing material to the shipment; and
   generating, based on the evaluation, a fit metric associated with a box kit used for the shipment and at least one other shipment.

8. The system of claim 1, wherein the image data includes machine-readable information associated with the shipment record; and
   wherein the unique identifier is determined based, at least in part, on the machine-readable information.

9. The system of claim 1, further comprising instructions for:
   determining a remaining void space for the shipment after adding the packing material to the shipment.

10. The system of claim 1, further comprising instructions for:
    accessing one or more other shipment records from the data store;
    evaluating the one or more other shipment records and the generated shipment record using machine learning techniques to determine one or more patterns associated with packing the item of the shipment; and
    generating one or more suggestions based on the determined one or more patterns.

11. The system of claim 1, further comprising instructions for:
    generating a combined image based on the image data, wherein the combined image comprises a plurality of images, and wherein the combined image comprises a timestamp for each of the plurality of images; and
    associating the combined image with the shipment record in the data store.

12. The system of claim 1, wherein the instructions comprise training the machine learning model based on shipment content, item arrangement in the shipment, quantity of void space, and arrangement of void space.

13. The system of claim 1, wherein the operations further comprise:
    generating a shipping label for a shipment;
    updating tracking information of the shipment;
    providing delivery indication when the shipment is delivered.

14. A method for processing a shipment record associated with a shipment, comprising:
    receiving, by one or more processors, image data from an image capture device, wherein the image data relates to an interior of the shipment before packing material is added;
    recognizing, by the one or more processors, an object from the image data, the object being recognized as an item to be shipped with the shipment;

receiving, by the one or more processors, information relating to the recognized object;

generating, by the one or more processors, a shipment record comprising at least a part of the image data and at least a part of the information relating to the recognized object;

storing, by the one or more processors, the shipment record in a data store;

accessing, by the one or more processors, one or more other shipment records from the data store;

actuating, by the one or more processors, transport of the shipment from an information gathering station to a filling station distinct from the information gathering station via a conveyance system;

determining, by the one or more processors, an inside configuration of the shipment, the inside configuration of the shipment comprising at least one of shipment content, item arrangement in the shipment, quantity of void space, and arrangement of void space for each of the one or more other shipment records;

evaluating, by the one or more processors, the determined inside configuration using machine learning inferences to determine one or more patterns associated with packing the item for the shipment, the machine learning inferences being based, at least in part, on one or more historical actions;

determining, by the one or more processors, whether at least one of the one or more patterns exceeds a threshold;

when at least one of the one or more patterns exceeds the threshold, generating, by the one or more processors, at least one suggestion based on the one or more patterns wherein the at least one suggestion comprises a corrective action for packing a packing material into a void space of the interior of the shipment; and providing, by the one or more processors, the at least one suggestion to a user device as an electronic communication.

15. The method of claim 14, further comprising:
determining dimension information relating to the shipment.

16. The method of claim 15, wherein the dimension information is determined prior to adding the packing material to the shipment, and wherein at least a part of the image data is received after adding the packing material to the shipment.

17. The method of claim 14, further comprising:
generating a combined image based on the image data, wherein the combined image comprises a plurality of images, and wherein the combined image comprises timestamps for each of the plurality of images, wherein the timestamps comprise a start timestamp and an end timestamp for packing the shipment; and
associating the combined image with the shipment record in the data store.

18. The method of claim 14, further comprising:
receiving user-generated data associated with the shipment; and
storing at least a part of the received user-generated data as part of the shipment record in the data store.

19. The method of claim 14, wherein using machine learning inferences comprises evaluating the shipment content, item arrangement in the shipment, quantity of void space, and arrangement of void space for each shipment record.

20. A method for generating a shipment record, comprising:

receiving, by one or more processors, a first image data from a first image capture device, wherein the first image data relates to an interior of the shipment located at an information gathering station before a packing material is added;

recognizing, by the one or more processors, a first object from the first image data, the first object being recognized as an item to be shipped with the shipment;

actuating, by the one or more processors, transport of the shipment from the information gathering station to a filling station distinct from the information gathering station via a conveyance system;

receiving, by the one or more processors, a second image data from a second image capture device different from the first image capture device, wherein the second image data relates to the interior of the shipment located at the filling station after the packing material is added;

recognizing, by the one or more processors, a second object from the second image data, the second object being recognized as the packing material for the shipment;

identifying, by the one or more processors, information associated with packing the item for the shipment;

generating, by the one or more processors, a shipment record comprising:
  at least a part of the first image data;
  at least a part of the second image data; and
  at least a part of the information associated with packing the item for the shipment;

determining, by the one or more processors, an inside configuration of the shipment, the inside configuration of the shipment comprising at least one of shipment content, item arrangement in the shipment, quantity of void space, and arrangement of void space based on the shipment record;

associating, by the one or more processors, the shipment record with a unique identifier;

storing, by the one or more processors, the shipment record associated with the unique identifier in a data store; and based on the determined inside configuration of the shipment, training, by the one or more processors, a machine learning model for at least a correlation between the item to be shipped with the shipment and the packing material for the shipment.

21. The method of claim 20, further comprising:
accessing one or more other shipment records from the data store;
evaluating the one or more other shipment records and the generated shipment record using machine learning techniques to determine one or more patterns associated with packing the item of the shipment; and
generating one or more suggestions based on the determined one or more patterns.

22. The method of claim 20, further comprising:
communicating at least a part of the generated shipment record to a shipping agent.

23. The method of claim 20, further comprising:
receiving a record request from a user device, wherein the record request comprises an identifier;
identifying at least one relevant shipment record based on the identifier; and
providing at least a part of the identified at least one relevant shipment record to the user device in response to the received request.

24. The method of claim 20, wherein training the machine learning model comprises training the machine learning model based on shipment content, item arrangement in the shipment, quantity of void space, and arrangement of void space.

* * * * *